US011378305B2

(12) United States Patent
Caron-L'Ecuyer et al.

(10) Patent No.: US 11,378,305 B2
(45) Date of Patent: Jul. 5, 2022

(54) NOISE REDUCING AIR DUCT

(71) Applicant: BOMBARDIER INC., Dorval (CA)

(72) Inventors: Alexis Caron-L'Ecuyer, Montreal (CA); Andre Brodeur, Laval (CA)

(73) Assignee: BOMBARDIER INC., Dorval (CA)

( * ) Notice: Subject to any disclaimer, the term of this patent is extended or adjusted under 35 U.S.C. 154(b) by 490 days.

(21) Appl. No.: 16/339,416

(22) PCT Filed: Sep. 28, 2017

(86) PCT No.: PCT/US2017/053947
§ 371 (c)(1),
(2) Date: Apr. 4, 2019

(87) PCT Pub. No.: WO2018/067370
PCT Pub. Date: Apr. 12, 2018

(65) Prior Publication Data
US 2020/0041167 A1  Feb. 6, 2020

Related U.S. Application Data

(60) Provisional application No. 62/404,660, filed on Oct. 5, 2016.

(51) Int. Cl.
*F24F 13/24*  (2006.01)
*B64D 13/00*  (2006.01)
*G10K 11/162*  (2006.01)

(52) U.S. Cl.
CPC .............. *F24F 13/24* (2013.01); *B64D 13/00* (2013.01); *G10K 11/162* (2013.01)

(58) Field of Classification Search
CPC ........ G10K 11/162; B64D 13/00; F24F 13/24
(Continued)

(56) References Cited

U.S. PATENT DOCUMENTS 2,122,447 A  7/1938  Zand
4,167,986 A  9/1979  Conway
(Continued)

FOREIGN PATENT DOCUMENTS

CN  203052948  10/2013
CN  203274205  11/2013
(Continued)

OTHER PUBLICATIONS

PCT International Search Report and Written Opinion dated Nov. 29, 2017 re: International Application No. PCT/US2017/053947.
(Continued)

*Primary Examiner* — Forrest M Phillips
(74) *Attorney, Agent, or Firm* — Norton Rose Fulbright Canada LLP

(57) ABSTRACT

An air duct includes a first chamber and a second chamber, the first chamber being defined between an air handling device and the second chamber, and the second chamber being defined between the first chamber and an environment exterior to the air duct, a plurality of first openings between the first chamber and the second chamber, a plurality of second openings between the second chamber and the environment exterior to the air duct, and a sound absorbing material defining at least a portion of an interior surface of at least one of the first chamber and the second chamber.

20 Claims, 7 Drawing Sheets

(58) Field of Classification Search
USPC .......................................................... 181/224
See application file for complete search history.

(56) References Cited

U.S. PATENT DOCUMENTS

| | | | | |
|---|---|---|---|---|
| 4,170,930 | A * | 10/1979 | Lind | .................. F24F 13/06 |
| | | | | 454/297 |
| 4,316,406 | A * | 2/1982 | Lind | .................. F24F 13/24 |
| | | | | 454/284 |
| 6,102,153 | A | 8/2000 | Willke, Jr. | |
| 8,066,096 | B1 | 11/2011 | Francisco et al. | |
| 8,146,706 | B2 | 4/2012 | Katoh et al. | |
| 8,166,775 | B2 | 5/2012 | Choi | |
| 8,899,377 | B2 | 12/2014 | Thomas | |
| 9,791,166 | B2 * | 10/2017 | Rainey | .................. F24F 3/0442 |
| 10,436,457 | B2 * | 10/2019 | Eicher | .................. F24F 3/153 |
| 10,458,376 | B2 * | 10/2019 | Kimura | .............. F02M 35/0201 |
| 10,508,573 | B2 * | 12/2019 | Pedrini | .................. F01N 1/10 |
| 10,753,638 | B2 * | 8/2020 | LeBlanc | .................. F02C 7/20 |
| 10,928,096 | B2 * | 2/2021 | Hickey | .................. F24F 13/24 |
| 11,039,975 | B2 * | 6/2021 | Watson | .................. B60N 2/976 |
| 2008/0035208 | A1 | 2/2008 | Bouhaj | |
| 2008/0308674 | A1 | 12/2008 | Frantz et al. | |
| 2008/0311840 | A1 | 12/2008 | Rainey et al. | |
| 2009/0200103 | A1 | 8/2009 | Potschka | |
| 2010/0077755 | A1 | 4/2010 | Jangili et al. | |
| 2010/0122869 | A1 | 5/2010 | Sengissen et al. | |
| 2010/0192616 | A1 | 8/2010 | Gores et al. | |
| 2011/0284689 | A1 | 11/2011 | Thomas et al. | |
| 2011/0294409 | A1 | 12/2011 | Edom et al. | |
| 2016/0091112 | A1 | 3/2016 | Gibbs | |
| 2021/0180487 | A1 * | 6/2021 | Mathai | ................. G10K 11/172 |

FOREIGN PATENT DOCUMENTS

| | | |
|---|---|---|
| CN | 203391778 | 4/2014 |
| CN | 103822344 | 5/2014 |
| CN | 104417757 | 3/2015 |
| CN | 204404488 | 6/2015 |
| CN | 105083529 | 11/2015 |
| GB | 1217597 | 12/1970 |
| GB | 1436727 | 5/1976 |

OTHER PUBLICATIONS

English translation of China patent document No. CN 103822344 dated May 28, 2014, https://patents.google.com/patent/CN103822344A/en?oq-CN 103822344, accessed on Apr. 9, 2019.

English translation of China patent document No. CN 104417757 dated Mar. 18, 2015, https://patents.google.com/patent/CN104417757A/en?oq-CN104417757A, accessed on Apr. 9, 2019.

English translation of China patent document No. CN 105083529 dated Nov. 25, 2015, https://patents.google.com/patent/CN105083529A/en?oq=CN105083529A, accessed on Apr. 9, 2019.

English translation of China patent document No. CN 203052948 dated Jul. 10, 2013, https://patents.google.com/patent/CN203052948U/en?oq=CN203052948U, accessed on Apr. 9, 2019.

English translation of China patent document No. CN203274205 dated Nov. 6, 2013, https://patents.google.com/patent/CN203274205U/en?oq=CN203274205U, accessed on Apr. 9, 2019.

English translation of China patent document No. CN 203391778 dated Jan. 15, 2014, https://patents.google.com/patent/CN203391778U/en?oq=CN203391778U, accessed on Apr. 9, 2019.

English translation of China patent document No. CN 204404488 dated Jun. 17, 2015, https://patents.google.com/patent/CN204404488U/en?oq=CN+204404488U, accessed on Apr. 9, 2019.

* cited by examiner

NOISE REDUCING AIR DUCT

CROSS-REFERENCE TO RELATED APPLICATION(S)

This application is a national phase application under 35 U.S.C. 371 of International Patent Application No. PCT/US2017/053947 filed on Sep. 28, 2017, which claims priority from U.S. Provisional Patent Application Ser. No. 62/404,660, entitled "NOISE REDUCING AIR DUCT," filed Oct. 5, 2016, the entire content of which is hereby incorporated by reference.

FIELD OF THE INVENTION

The present invention concerns an air duct with a construction that reduces noise generated by air passing through the air duct. The air duct of the present invention is contemplated to be disposed in a vehicle with a heating, ventilation, and air conditioning ("HVAC") system. More specifically, the air duct of the present invention is contemplated to be provided in an aircraft air recirculation system. The air duct of the present invention is contemplated to be provided for both air distribution and air return.

DESCRIPTION OF THE BACKGROUND AND RELATED ART

As should be apparent to those skilled in the art, air ducts are employed in vehicles to distribute air from an air handler to the passenger compartment and also to return the air from the passenger compartment to the air handler.

Air ducts typically include bends and turns to avoid one or more obstacles. The bends and turns may create a torturous path from the air handler to the passenger compartment.

Air ducts also typically include a plurality of outlets to discharge air from the air distribution ducts into the passenger compartment. Additionally, the air ducts may have a plurality of inlets to receive air into the air return ducts from the passenger compartment.

As should be apparent to those skilled in the art, bends in the duct present localized changes in the air flow, thereby creating the potential for noise generation at or near the locations of the bends.

Similarly, the inlets and outlets in the air ducts also create localized changes in the air flow. As such, the inlets and outlets also may establish areas where there is a potential for noise generation.

With respect to any air ducting system, it is desirable to reduce noise generation to improve passenger comfort.

In the case of an air duct system on an aircraft, it is desirable to reduce the weight of the air duct system so that the air duct system has a reduced impact on the overall weight of the aircraft.

In view of a desire for ever more silent air ducting systems, a need has developed to improve upon the construction of known air ducts.

SUMMARY OF THE INVENTION

The present invention addresses one or more of the deficiencies with respect to the prior art.

Specifically, the present invention provides an air duct that includes a first chamber and a second chamber, the first chamber being defined between an air handling device and the second chamber, and the second chamber being defined between the first chamber and an environment exterior to the air duct, a plurality of first openings between the first chamber and the second chamber, a plurality of second openings between the second chamber and the environment exterior to the air duct, and a sound absorbing material defining at least a portion of an interior surface of at least one of the first chamber and the second chamber.

It is contemplated that the sound absorbing material may be disposed on at least a portion of an interior surface of the first chamber.

Still further, the sound absorbing material may be disposed on at least a portion of an interior surface of the second chamber.

In one contemplated embodiment, the air duct also may include a body defining a periphery of the air duct, the body having a first portion defining at least a portion of the first chamber and a second portion defining at least a portion of the second chamber.

It is also contemplated that the air duct may have a wall dividing the air duct into the first chamber and the second chamber. If so, the wall may define at least a portion of the interior surface of the first chamber and the second chamber.

In another embodiment, the air duct may have a body defining a length between a first end and a second end. The sound absorbing material may extend along a portion of the length.

It is contemplated that the plurality of second openings may be disposed between the plurality of first openings.

In a further embodiment, the body may be cylindrical.

Still further, the body may be constructed so that a first portion is separable from a second portion. If so, the first portion may connect to the second portion by a snap-fit connector.

It is contemplated, in selected embodiments, that a first cross-sectional area of the first chamber is greater than or equal to a second cross-sectional area of the second chamber.

The present invention also provides an aircraft that combines a fuselage and an air duct mounted within the fuselage. The air duct includes a first chamber and a second chamber, the first chamber being defined between an air handling device and the second chamber, and the second chamber being defined between the first chamber and an environment exterior to the air duct, a plurality of first openings between the first chamber and the second chamber, a plurality of second openings between the second chamber and the environment exterior to the air duct, and a sound absorbing material defining at least a portion of an interior surface of at least one of the first chamber and the second chamber.

In one embodiment of the aircraft, the sound absorbing material is disposed on an interior of the first chamber.

In another embodiment, the sound absorbing material may be disposed on the interior of the second chamber or on a portion of the interior of the second chamber.

Alternatively, the air duct further may include a body defining a periphery of the air duct, the body including a first portion defining at least a portion of the first chamber and a second portion defining at least a portion of the second chamber.

In one embodiment, the plurality of second openings are disposed between the plurality of first openings.

In a further embodiment, the first portion is separable from the second portion and the first portion connects to the second portion by a snap-fit connector.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

It is noted that the present invention is described in connection with aircraft. The present invention should not be understood, however, to be limited to aircraft. The air duct of the present invention may be employed with other vehicles including, but not limited to, automobiles, boats, ships, trains, etc. Still further, it is contemplated that the air duct of the present invention may be employed in buildings and other structures with air distribution and/or air recirculation systems.

Figure 1:
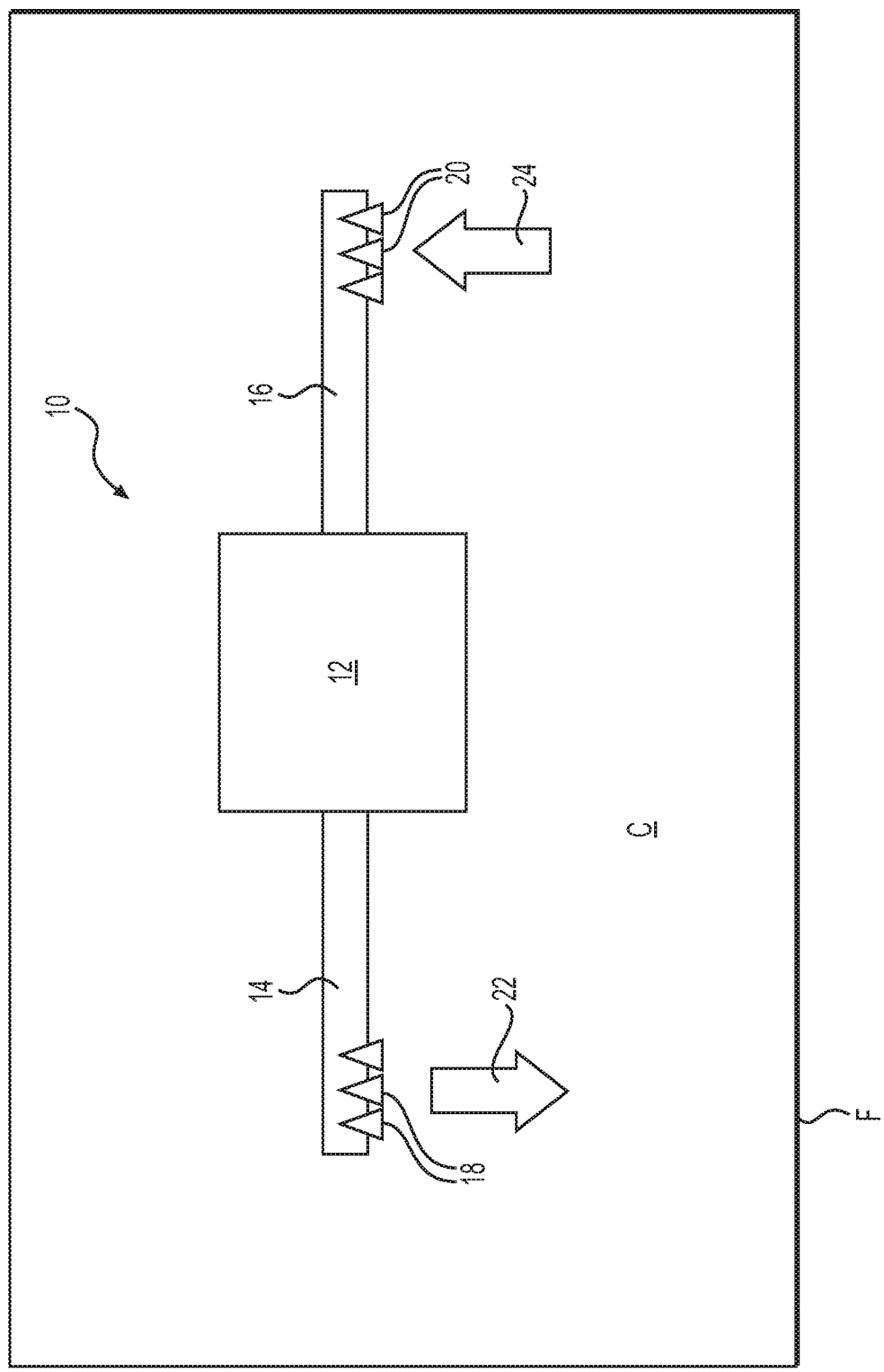
FIG. 1 is a graphical illustration of a generic air handling system, providing a framework for discussing the deficiencies of the prior art and the advantages of the present invention.

FIG. 1 is a graphical representation of an air handling system 10. The air handling system 10 is provided by way of background to the discussion of the present invention. The air handling system 10 is contemplated to be an HVAC system. The air handling system 10 is generic to air handling systems, generally.

The air handling system 10 shown in FIG. 1 includes an air handler 12 connected to one or more air distribution ducts 14 and one or more air return ducts 16. One or more outlets 18 may be provided along the length of the air distribution duct 14. Similarly, one or more inlets 20 may be provided along the length of the air return duct 16. For clarity, an arrow 22 illustrates generally the flow of air from the outlets 18. An arrow 24 illustrates the flow of air into the inlets 20.

As should be apparent to those skilled in the art, the air handler 12 typically includes one or more air movers. Air movers include fans, for example. In addition, the air handler 12 may include one or more heat exchangers (or other devices) to adjust the temperature of the air passing through the air handler 12. Still further, the air handler 12 may include one or more filters (or other devices) to condition the air passing through the air handler 12 for recirculation. For example, the air handler 12 may include a charcoal filter to remove one or more olfactory irritants. Still further, the air handler 12 may include a particulate filter and/or an ultraviolet light source to reduce the occurrence of airborne organisms. As should be apparent from the foregoing, the air handler 12 is not intended to be limiting of the present invention.

As also should be apparent to those skilled in the art, one or more outlets 18 are contemplated to be positioned along the length of the air distribution duct 14. Similarly, one or more inlets 20 are contemplated to be disposed along the length of the air return duct 16. The precise locations of the outlets 18 and the inlets 20 may differ from one aircraft to the next, depending upon the air requirements of the aircraft.

Three non-limiting embodiments of an air duct 70, 128, 142 according to the present invention are discussed in connection with FIGS. 2-7.

Figure 2:
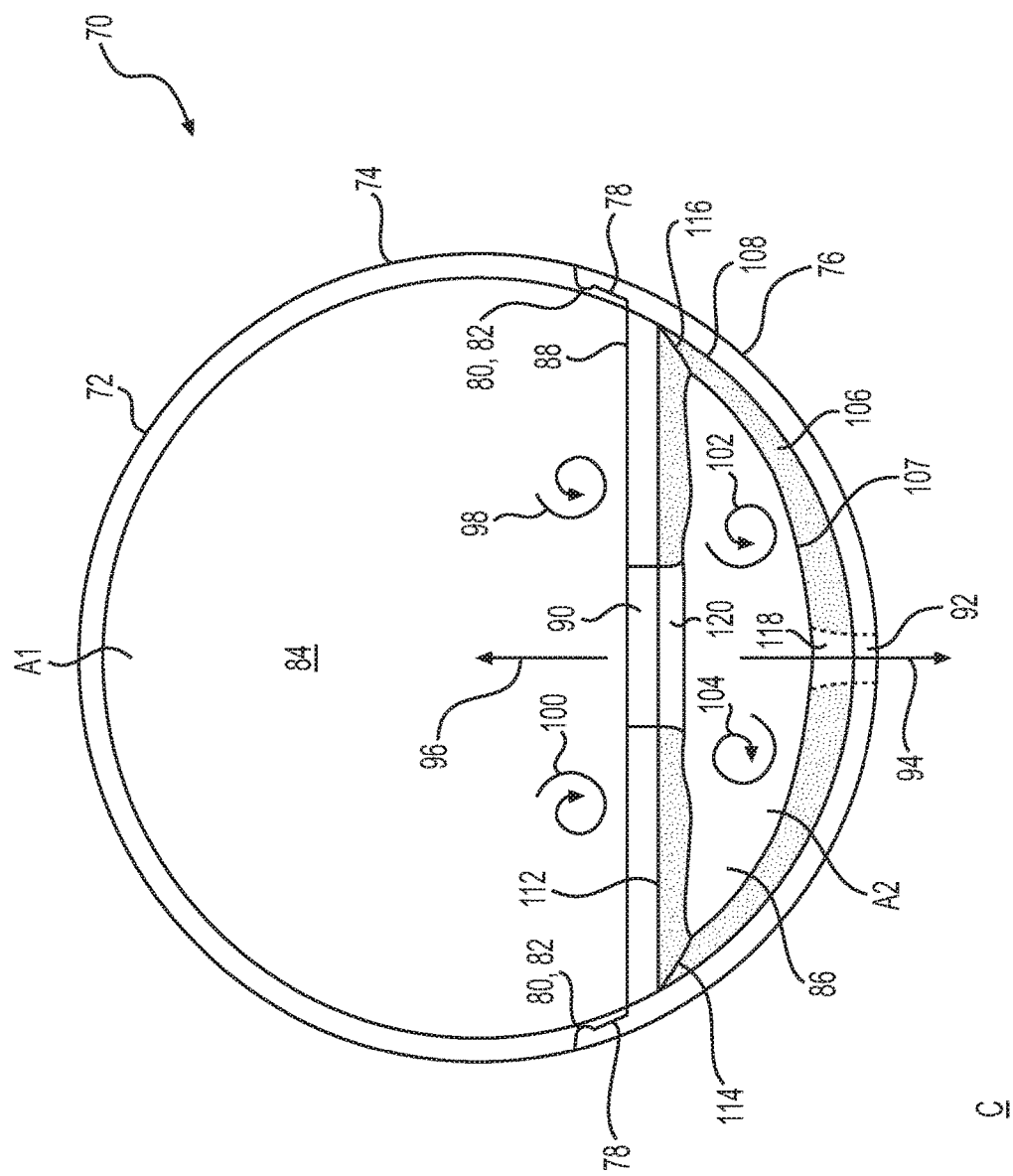
FIG. 2 is a cross-sectional side view of a first embodiment of an air duct according to the present invention, with the cross-section being taken across a width of the air duct.
Figure 3:
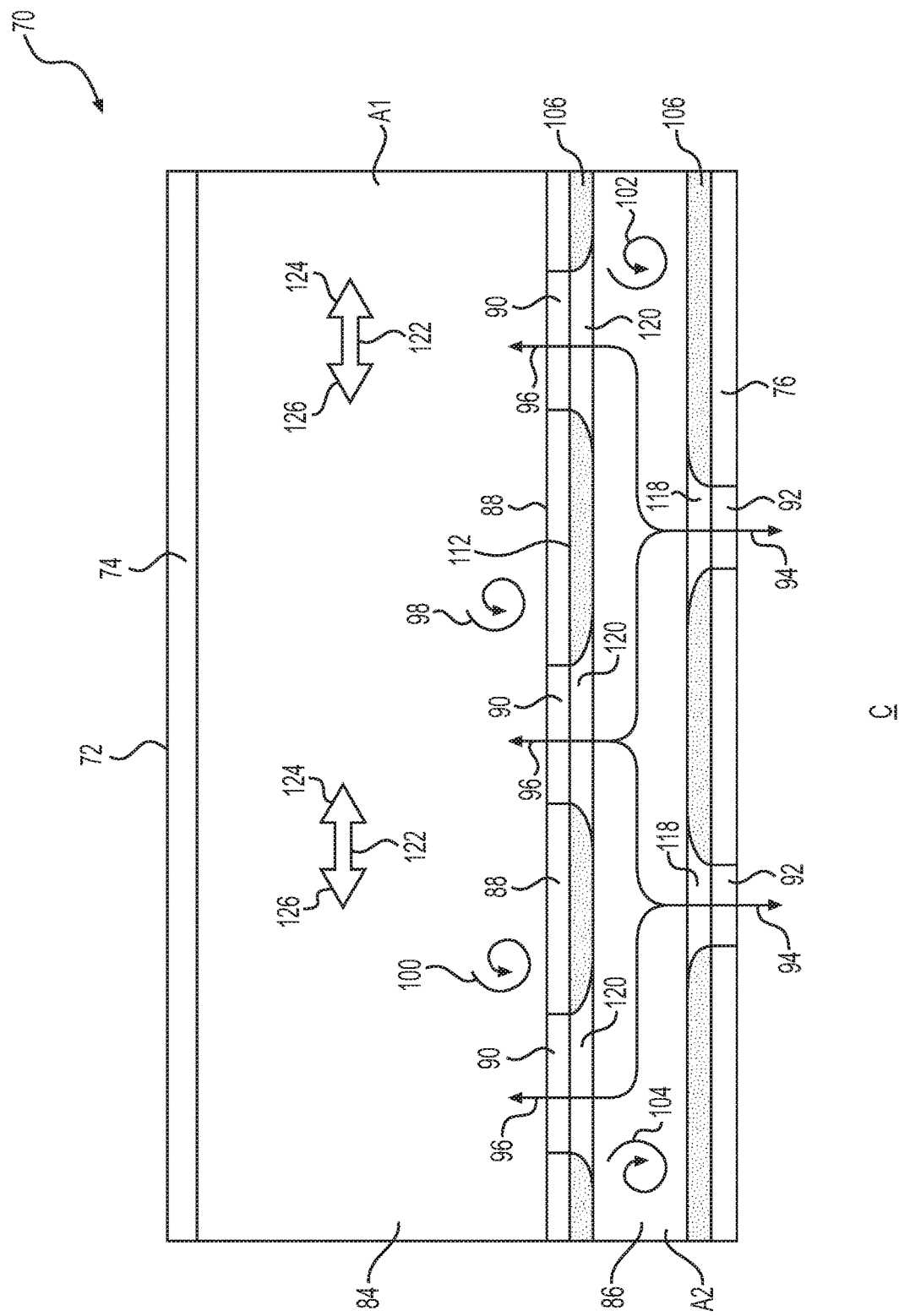
FIG. 3 is a cross-sectional side view of the first embodiment of the air duct according to the present invention, with the cross-section being taken along a length of the air duct.

An air duct 70 according to a first embodiment of the present invention is illustrated in FIGS. 2-3. It is noted that the air duct 70 may function as an air distribution duct 14 or as an air return duct 16.

With respect to FIG. 2, the cross-section of the air duct 70 is taken across a width of the air duct 70. The air duct 70 is cylindrically shaped and is defined by a body 72.

While the air duct 70 is illustrated as being circular in cross-section, the present invention should not be understood to be limited solely to the illustrated shape. The cross-section of the air duct 70 may take any shape without departing from the scope of the present invention. Without limiting the present invention, the duct 70 may have a cross-section that is oval, elliptical, semi-circular, triangular, square, rectangular, polygonal, or amorphously-shaped, as required or as desired.

In addition, the air duct 70 need not have a uniform shape from one end to the other. Instead, the shape of the air duct 70 may vary from one end to the other without departing from the scope of the present invention.

The body 72 includes a first (or upper) portion 74 and a second (or lower) portion 76. The second portion 76 is contemplated to connect to the first portion 74 via snap-fit connectors 78. Each snap-fit connector 78 includes a protrusion 80 that engages a complimentary groove 82 in the wall of the body 72, permitting the first portion 74 and the second portion 76 to be secured to one another.

Concerning the snap-fit connector 78, it is noted that this feature is not required to practice the present invention. The first portion 74 of the air duct 70 may connect to the second portion 76 by any suitable connector. For example, fasteners or adhesives may be employed.

With respect to the embodiments of the air duct 70, 128, 142 discussed herein, the first and second portions 74, 76 may be separable from one another to permit access to the interior of the air duct 70. This may be helpful for maintenance and/or repair. As should be apparent to those skilled in the art, the snap-fit connectors 78 provide a simple, but effective, connection between the first portion 74 and the second portion 76 of the air duct 70.

In an alternative embodiment, the first portion 74 and the second portion 76 of the housing 72 may be integrally formed.

In one further contemplated embodiment, the air duct 70 may have a portion of its length where the first portion 74 is integrally formed with the second portion 76. Another portion of the length of the air duct 70 may be constructed so that the second portion 76 is separable from the first portion 74. In other words, where employed, the snap-fit connector 78 (or alternative fastener) may be employed along selected stretches of the air duct 70, as required or as desired.

With respect to FIG. 2, the first portion 74 is illustrated as being an upper portion of the air duct 70. The second portion 76 is illustrated as being a lower portion of the air duct 70. The terms "upper" and "lower" have been selected with reference to the illustrations and, therefore, are provided merely for convenience. As such, it is noted that the orientation of the air duct 70 may depart from the orientation shown in the figures. As should be apparent to those skilled in the art, the angular orientation of the air duct 70 is not critical to the present invention. The body 72 may be rotated by any angular amount from the position(s) illustrated without departing from the scope of the present invention.

The body 72 is divided into a first chamber 84 and a second chamber 86. The first chamber 84 is separated from the second chamber 86 by a wall 88. The wall 88 defines a plurality of openings 90 therein, with one of the openings 90 being visible in FIG. 2. Similarly, the second portion 76 defines a plurality of openings 92 therethrough, with one of the openings 92 being shown in dotted line format.

The wall 88 may be integrally formed with either the first portion 74 of the body 72 or the second portion 76 of the body 72. Alternatively, in the case where the first portion 74 and the second portion 76 of the body 72 are integrally formed with one another, the wall 88 also may be integrally formed with the body 72. In a further alternative embodiment, the wall 88 may be formed from two facing walls (not shown), with one of the walls formed with the first portion 74 and another one of the walls formed with the second portion 76 of the body 72. The thickness of wall 88 is thus formed when the first portion 74 and the second portion 76 are attached together.

The first portion 74, the second portion 76, and the wall 88 are contemplated to be made from the same material. Specifically, the first portion 74, the second portion 76, and the wall 88 are contemplated to be made from plastic. In the alternative, other materials may be employed. Without limiting the present invention, the first portion 74, the second portion 76, and the wall 88 may be made from metals such as iron, steel, aluminum, copper, and/or alloys thereof. Still further, the first portion 74, the second portion 76, and the wall 88 may be made from a composite material, such as a carbon fiber composite material. Still further, the first portion 74, the second portion 76 and the wall 88 may be made from an open cell material, such as a foam material. Additionally, the first portion 74 may be made from a different material than the second portion 76 and/or the wall 88.

When the air duct 70 functions as an air distribution duct 14, air from the air handler 12 is introduced first into the first chamber 84. The air passes from the first chamber 84 into the second chamber 86 via the plurality of openings 90. From the second chamber 86, the air exits into the aircraft cabin C through the plurality of openings 92.

When the air duct 70 functions as an air return duct 16, the air is drawn into the second chamber 86 from the cabin C through the openings 92. From the second chamber 86, the air is drawn into the first chamber 84 through the openings 90, whereupon the air is returned to the air handler 12.

As illustrated in FIG. 2, the air exiting from the air duct 70 exits in the direction of the arrow 94. Air being drawn into the air duct 70 travels in the direction of the arrow 96, which is opposite to the arrow 94.

In the operation of the air duct 70, and particularly when the air duct 70 acts as an air return duct 16, it is contemplated that a number of first eddies 98, 100 may form near to each of the plurality of openings 90 within the first chamber 84. The first eddies 98, 100 are contemplated to form in the first chamber 84 when relatively high speed air flowing within the first chamber 84 intersects with the relatively slower speed air flowing into the first chamber 84 from the second chamber 86. This intersection of the two flows is known to create noise.

Similarly, a number of second eddies 102, 104 may form at the periphery of the plurality of openings 92. These second eddies 102, 104 are contemplated to form in the second chamber 86. Each of the eddies 98, 100, 102, 104 represent locations where the air flow may generate sound in the form of noise.

For purposes of understanding the present invention, the locations of the eddies 98, 100, 102, 104 are not intended to be limiting of the air duct 70. As should be apparent, the eddies 98, 100, 102, 104 may form at any location within the air duct 70, not just at the identified locations. Moreover, as should be apparent to those skilled in the art, the eddies 98, 100, 102, 104 may form in connection with features other than the openings 90, 92.

To reduce the propagation of the noise from the eddies 98, 100, 102, 104 or other noise generating phenomena, the air duct 70 includes a sound absorbing material 106 defining at least a portion of the interior surface 107 of the second chamber 86. In the non-limiting embodiment shown, the sound absorbing material 106 is disposed on an interior surface 108 of the second portion 76 of the body 72 and on a second-chamber-facing surface 112 of the wall 88. The sound absorbing material 106 establishes a sound absorbing barrier in the second chamber 86 of the air duct 70. The sound absorbing material 106 may coat the entirety of the interior surface 108 of the second portion 76 of the body 72 and the entirety of the second-chamber-facing-surface 112 of the wall 88, so as to define the interior surface 107 of the second chamber 86. In some embodiments, the sound absorbing material 106 meets at seams 114, 116, where the second portion 76 of the body 72 meets the wall 88 (or is closely adjacent thereto).

As should also be apparent from the illustration provided in FIG. 2, the sound absorbing material 106 includes a plurality of openings 118 that are in register with the openings 92 in the second portion 76 of the air duct 70. Similarly, the sound absorbing material 106 includes a plurality of openings 120 that are in register with the openings 90 in the wall 88.

For the embodiment of the air duct 70, the sound absorbing material 106 may comprise a foam material. The foam material may be an open cell foam, a closed cell foam, or a hybrid of open cell and closed cell foam. Open cell and semi-open cell foams are contemplated to be acceptable materials that may be employed in connection with the present invention.

Polyurethane foams are contemplated to be suitable for the sound absorbing material 106. Melamine foams also may be employed, as should be apparent to those skilled in the art. Alternatively, the sound absorbing material 106 may be made from any other materials including, but not limited to, plastics, rubbers, fibrous materials, cellulose materials, cotton, gels, and the like. Felt or other non-woven materials also may be employed without departing from the scope of the present invention.

The sound absorbing material 106 may be applied as a coating to the interior surfaces 108, 112 of the second chamber 86. The sound absorbing material 106 may cover all of or only part of the interior surfaces 108, 112 of the second chamber 86. Still further, the sound absorbing material 106 may be applied as one or more layers (such as a laminate) affixed to the interior surfaces 108, 112 of the second chamber 86 via an adhesive or other suitable fastener, as should be apparent to those skilled in the art. The layers may be formed from multiple films and/or layers that are stacked atop one another. Still further, the wall 88 and the second portion 76 of the body 72 may be made of the sound absorbing material 106 such that there is no need for a film, layer or coating.

Regardless of its composition, the sound absorbing material 106 establishes a sound barrier to the propagation of sounds that may be generated by one or more of the eddies 98, 100, 102, 104 within the air duct 70.

Still further, the sound absorbing material 106 is contemplated to provide a barrier to noise generated at locations other than at the locations of the eddies 98, 100, 102, 104. As indicated above, sound may be generated at a bend in the air duct 70. Still further, noise may be generated at the air handler 12, by a fan, by filters, by restrictors, by an air conditioning system, etc. These additional noises also are contemplated to be absorbed, dissipated, abated, muted and/or muffled by the sound absorbing material 106.

It is contemplated that the wall 88 is removable from the interior of the body 72 of the air duct 70 after removal of the second portion 76 from the first portion 74. Removal of the wall 88 provides access to the interior of the first chamber 84. This construction is contemplated to facilitate maintenance on and/or repair of the air duct 70. This construction also is contemplated to facilitate manufacture of the air duct 70, because the sound absorbing material 106 may be applied to the wall 88 and the second portion 76 before the air duct 70 is assembled.

FIG. 3 is a cross-sectional side view of the air duct 70 illustrated in FIG. 2, with the cross-section being taken along a length of the air duct 70. The offset relationship between the openings 90 and the openings 92 is highlighted in this illustration. It is contemplated that the openings 92 will be positioned at roughly the midpoint between adjacent ones of the openings 90 and vice-versa. It is contemplated that this provides a maximum distance from one of the openings 90 to one of the openings 92, thereby presenting a maximum distance for absorption of sound by the sound absorbing material 106.

Alternatively, depending on the shape of the air duct 70, the locations of any restrictors, etc., the distance between the openings 90, 92 may be adjusted to provide optimal sound characteristics, as required or as desired. For example, the presence of a restrictor may suggest that adjacent openings 90, 92 be moved closer together or farther apart, as required or as desired. And, as noted above, the sound absorbing material 106 may be disposed only on a portion of the second chamber 86 of the air duct 70 or along only a portion of the length of the air duct 70, as required or as desired.

With continued reference to FIG. 3, the bidirectional air flow is illustrated via the arrows 122. As should be apparent from the foregoing, the direction of travel of the air within the first chamber 84 depends upon how the air duct 70 is utilized. If the air duct 70 is used as an air distribution duct 14, the air will travel in direction 124. If the air duct is used as an air return duct 16, the air will travel in an opposite direction 126. Air flows in the same manner in the second chamber 86.

Figure 4:
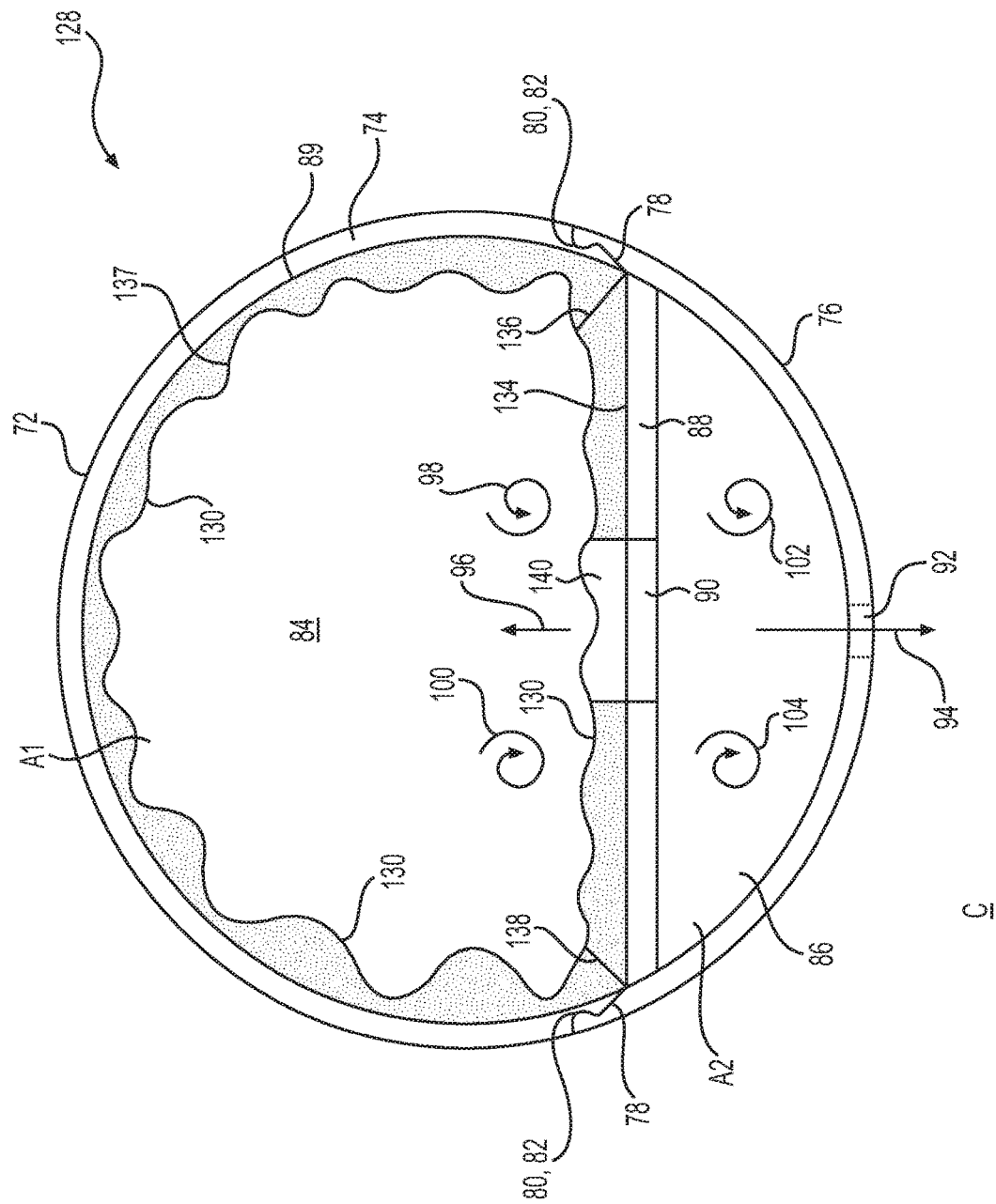
FIG. 4 is a cross-sectional side view of a second embodiment of an air duct according to the present invention, with the cross-section being taken across a width of the air duct.
Figure 5:
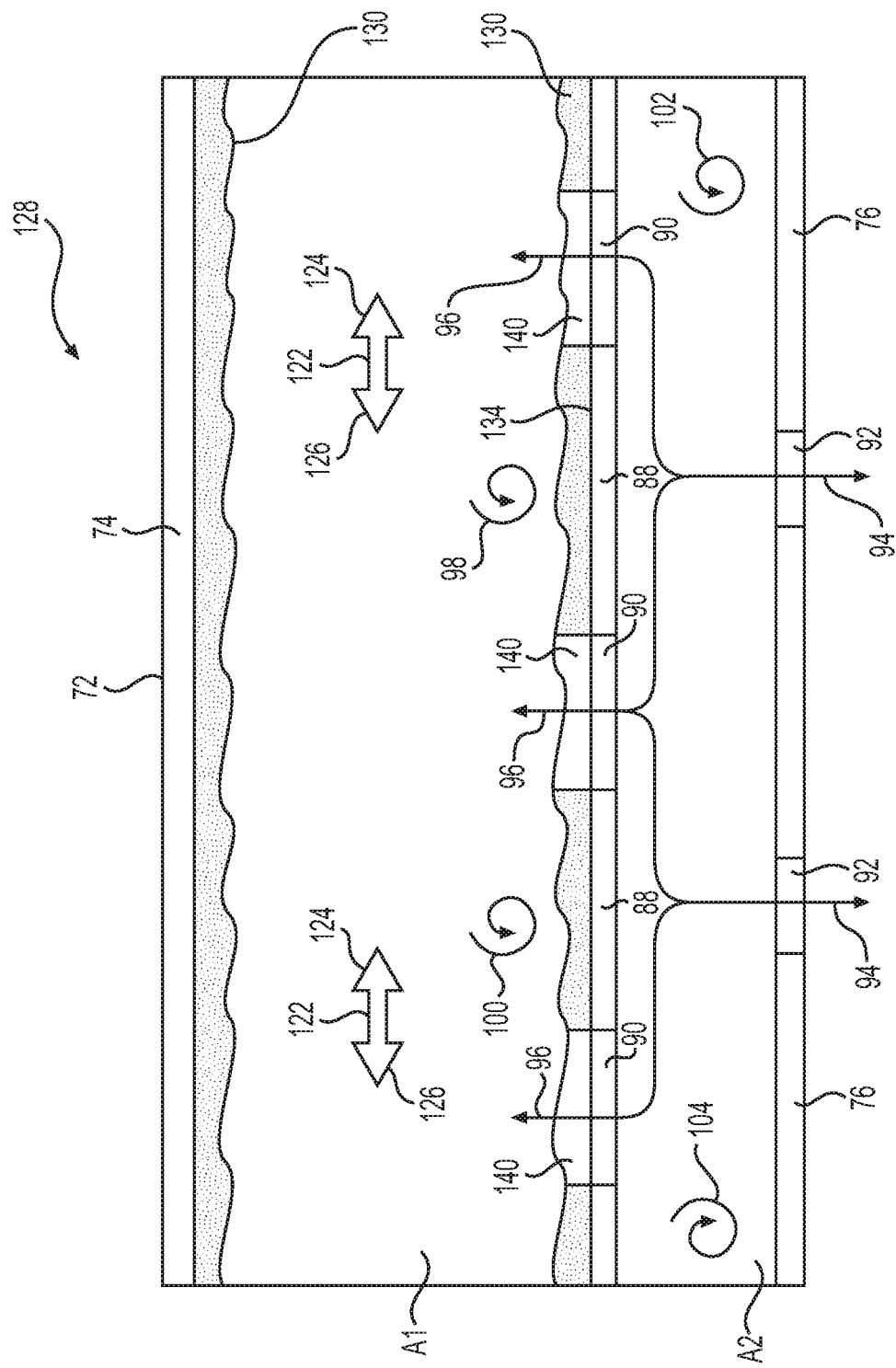
FIG. 5 is a cross-sectional side view of the second embodiment of the air duct according to the present invention, with the cross-section being taken along a length of the air duct.

FIGS. 4 and 5 illustrate a second embodiment of an air duct 128 according to the present invention.

The air duct 128 shares a number of features in common with the air duct 70 illustrated in FIGS. 2 and 3. Accordingly, the same reference numbers are used to refer to those similar features.

Like the air duct 70, the air duct 128 has a body 72 that defines a first chamber 84 and a second chamber 86. However, in this embodiment, a sound absorbing material 130 defines at least a portion of the interior surface 137 of the first chamber 84. The sound absorbing material 130 may be disposed on an interior surface 89 of the first chamber 84 and on a first-chamber-facing surface 134 of the wall 88. The sound absorbing material 130 forms a sound absorbing barrier in the first chamber 84. Parts of the sound absorbing material 130 may meet at the seams 136, 138 adjacent to or nearly adjacent to the wall 88.

The sound absorbing material 130 defines a plurality of openings 140 that are in register with the openings 90 in the wall 88.

The sound absorbing material 130 muffles noises generated at least by the eddies 98, 100, thereby reducing the noise generated by the air duct 128.

For the embodiment of the air duct 128, the sound absorbing material 130 may comprise a foam material. The foam material may be an open cell foam, a closed cell foam, or a hybrid of open cell and closed cell foam. Open cell and semi-open cell foams are contemplated to be acceptable materials that may be employed in connection with the present invention.

Polyurethane foams are contemplated to be suitable for the sound absorbing material 130. Melamine foams also may be employed, as should be apparent to those skilled in the art. Alternatively, the sound absorbing material 130 may be made from any other materials including, but not limited to, plastics, rubbers, fibrous materials, cellulose materials, cotton, gels, and the like. Felt or other non-woven materials also may be employed without departing from the scope of the present invention.

The sound absorbing material 130 may be applied as a coating to the interior surfaces 89, 134 of the first chamber 84. The sound absorbing material 130 may cover all of or only part of the interior surfaces 89, 134 of the first chamber 84. Still further, the sound absorbing material 130 may be applied as one or more layers (such as a laminate) affixed to the interior surfaces 89, 134 of the first chamber 84 via an adhesive or other suitable fastener, as should be apparent to those skilled in the art. The layers may be formed from multiple films and/or layers that are stacked atop one another. Still further, the wall 88 and the first portion 74 of the body 72 may be made of the sound absorbing material 130 such that there is no need for a film, layer or coating.

FIG. 5 is a cross-sectional side view of the air duct 128 illustrated in FIG. 4, with the cross-section being taken along a length of the air duct 128. The air flow is the same as described in connection with the air duct 70.

Figure 6:
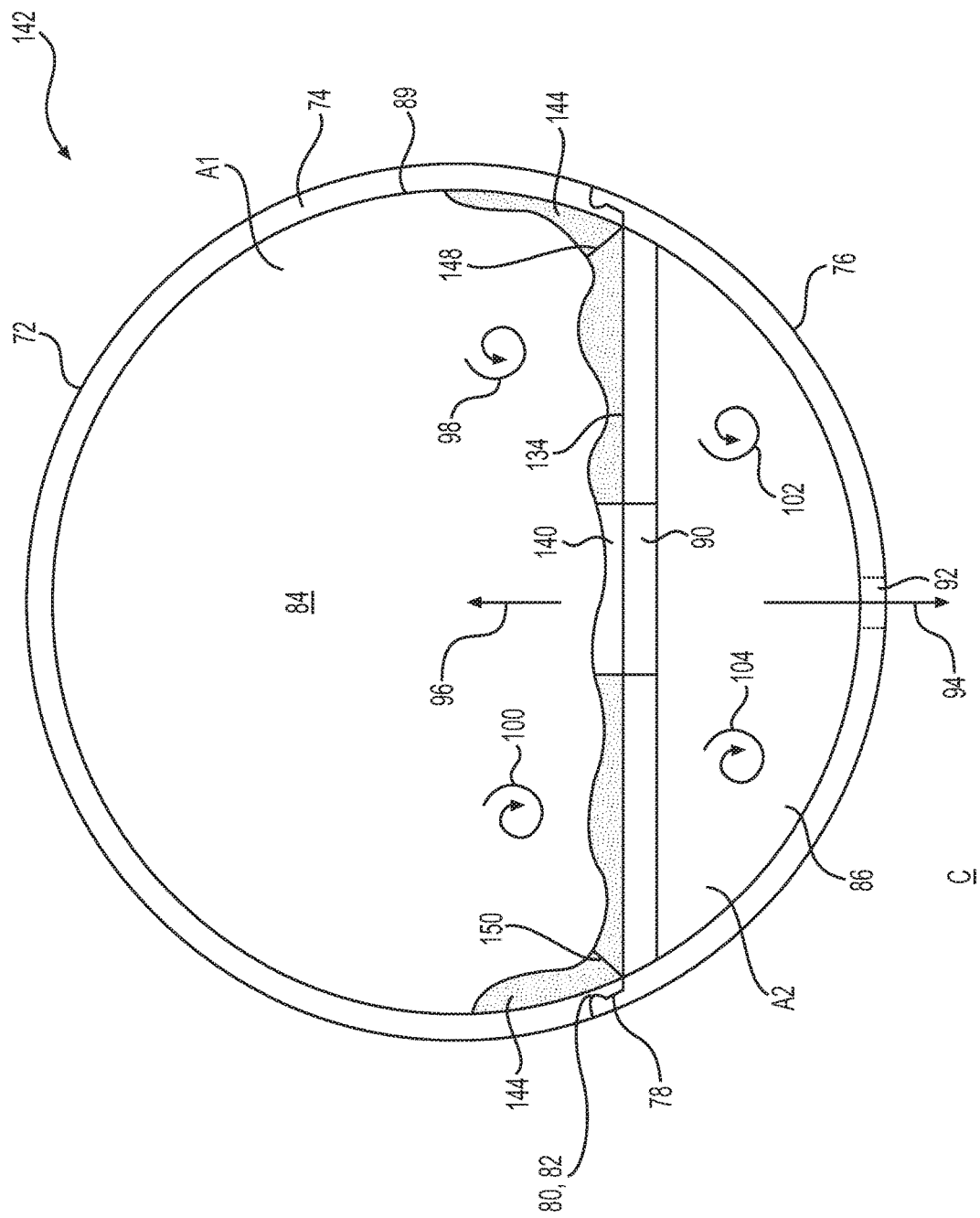
FIG. 6 is a cross-sectional side view of a third embodiment of an air duct according to the present invention, with the cross-section being taken across a width of the air duct.
Figure 7:
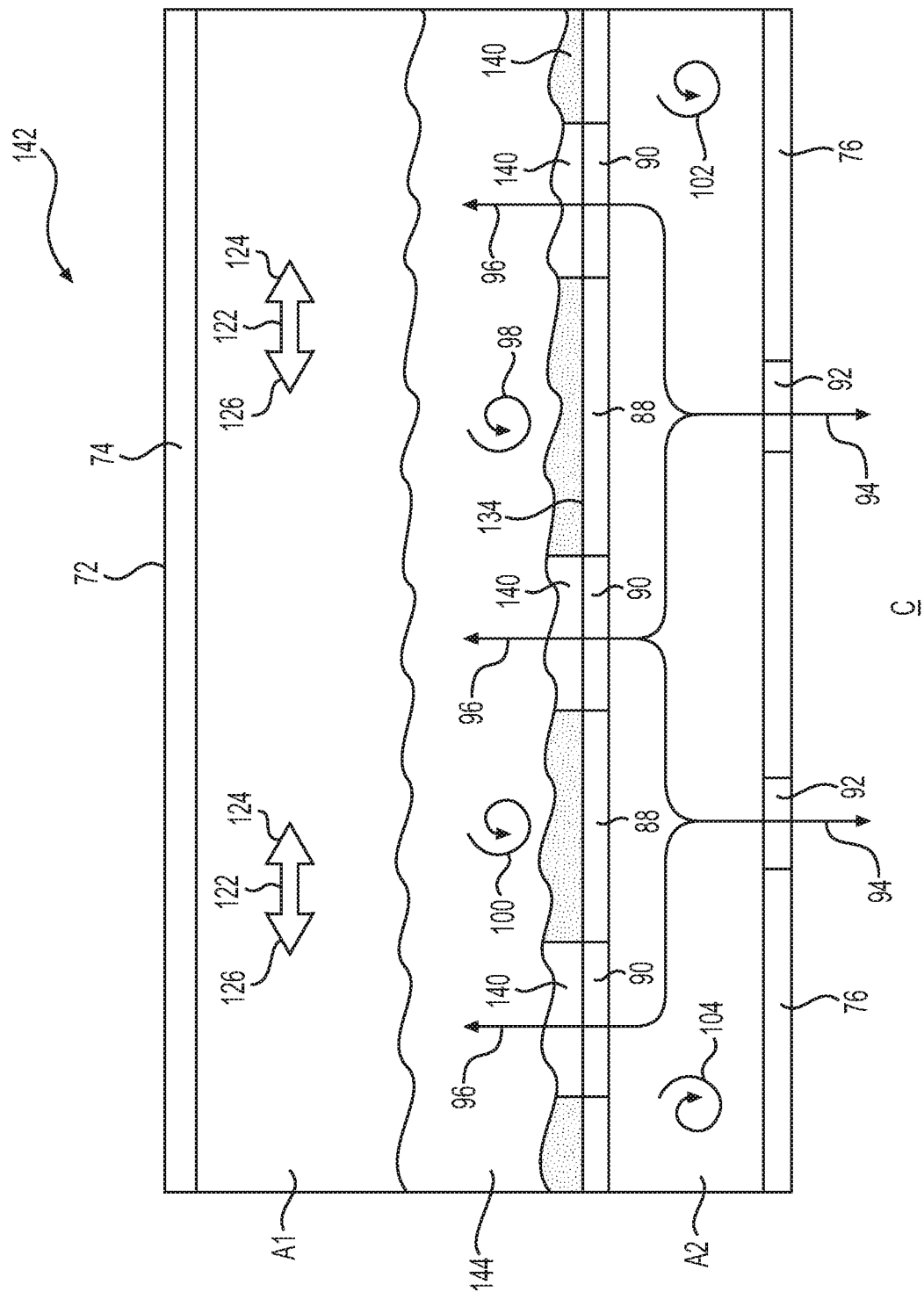
FIG. 7 is a cross-sectional side view of the third embodiment of the air duct according to the present invention, with the cross-section being taken along a length of the air duct.

FIGS. 6 and 7 illustrate a third embodiment of an air duct 142 according to the present invention.

Like the air ducts 70 and 128, the air duct 142 has a body 72 that is divided into a first chamber 84 and a second chamber 86. In this third embodiment, sound absorbing material 144 is disposed only on part of the interior surface 89 of the first portion 74. Similar to the air duct 128, the sound absorbing material 144 also is disposed on the first-chamber-facing surface 134 of the wall 88.

The sound absorbing material 144 forms a sound absorbing barrier. As shown, the sound absorbing material 144 includes seams 148, 150 that are adjacent to the wall 88 as in the prior embodiments. As should be apparent from the discussion above, the sound absorbing material 144 may be disposed on only a portion of the length of the air duct 142, as required or as desired.

The sound absorbing material 144 defines a plurality of openings 140 that are in register with the openings 90 in the wall 88.

Similar to the air duct 128, the sound absorbing material 144 muffles noises generated at least by the eddies 98, 100, thereby reducing the noise generated by the air duct 142.

Similarly to air ducts 70, 128, the sound absorbing material 144 may comprise a foam material. The foam material may be an open cell foam, a closed cell foam, or a hybrid of open cell and closed cell foam. Open cell and semi-open cell foams are contemplated to be an acceptable material that may be employed in connection with the present invention.

Polyurethane foams are contemplated to be suitable for the sound absorbing material 144. Melamine foams also may be employed, as should be apparent to those skilled in the art. Alternatively, the sound absorbing material 144 may be made from any other materials including, but not limited to, plastics, rubbers, fibrous materials, cellulose materials, cotton, gels, and the like. Felt or other non-woven materials also may be employed without departing from the scope of the present invention.

The sound absorbing material 144 may cover all of or only part of the first-chamber-facing surface 134 of the first chamber 84. Still further, the sound absorbing material 144 may be applied as one or more layers (such as a laminate) affixed to the first-chamber-facing surface 134 of the first chamber 84 via an adhesive or other suitable fastener, as should be apparent to those skilled in the art. The layers may be formed from multiple films and/or layers that are stacked atop one another. Still further, the wall 88 may be made of the sound absorbing material 144 such that there is no need for a film, layer or coating.

FIG. 7 is a cross-sectional side view of the air duct 142 illustrated in FIG. 6, with the cross-section being taken along a length of the air duct 142. The air flow is the same as described in connection with the air ducts 70, 128.

As should be apparent to those skilled in the art, aspects of the air ducts 70, 128, 142 may be combined and/or interchanged to create variations on the three embodiments described herein. For example the sound absorbing material 106 from the air duct 70 may be combined with the sound absorbing material 130 from the air duct 128. If so, the resulting air duct would be provided with sound absorbing materials 106, 130 in the first chamber 84 and in the second chamber 86. Such a construction is contemplated to provide further sound muffling capabilities.

As should be apparent from the constructions of the air duct 70, the air duct 128, and the air duct 142, considerations of noise reduction are balanced against the added weight associated with the sound absorbing material 106, 130, 144. Since it is contemplated that the sound absorbing material 106, 130, 144 adds minimal weight to the air duct 70, 128, 142, it is contemplated that the configuration of the air ducts 70, 128, 142 may find applicability to aircraft. As noted herein, particular configurations of the sound absorbing material 106, 130, 144 may be more effective to muffle sound than others.

With respect to the air ducts 70, 128, 142 described above, the sound absorbing material 106, 130, 144 has been described as extending from one end of the air ducts 70, 128, 142 to the other. However, the present invention is not intended to be limited to such a construction. It is contemplated that the sound absorbing barriers created by the sound absorbing material 106, 130, 144 may be provided only at or near openings 92 that are closest to the seats in the cabin C. For example, there are segments of the air ducts 70, 128, 142 that may be positioned behind a galley, a closet, or other areas on the aircraft where noise abatement is less of a concern, because there are no passenger seats near to those locations. Sound absorbing barriers may be less likely to be needed in these areas than closer to the seats in the cabin C.

For each of the air ducts 70, 128, 142, the first chamber 84 has a larger cross-sectional area A1 than the cross-sectional area A2 of the second chamber 86. It is contemplated that the first chamber 84 will have a larger cross-sectional area A1 to facilitate distribution of air to the cabin C or return of air from the cabin C. It is noted that the sizes of the cross-sectional areas A1, A2 may be adjusted as required or as desired for a particular configuration of the air ducts 70, 128, 142. A1 is contemplated to be greater than or equal to A2. However, the present invention also contemplates that A2 may be greater than or equal to A1.

With renewed reference to FIG. 1, it is contemplated that the air handling system 10 may be disposed within a fuselage F of an aircraft. As should be apparent to those skilled in the art, the fuselage F encloses the cabin C. Accordingly, the air ducts 70, 128, 142 are contemplated to be positioned within the fuselage F of the aircraft.

In one contemplated arrangement of the air ducts 70, 128, 142 within an aircraft, the air handling system 10 may be designed so that the air intake duct(s) 16 are located in the personal service unit ("PSU"), which may be above the heads of the passengers. The air distribution duct(s) 14 may be positioned in proximity to the floor of the cabin C of the aircraft. In another contemplated embodiment, the locations of the air intake duct(s) 16 and the air distribution duct(s) 14 may be reversed so that the air intake duct(s) 16 are proximate to the floor, while the air distribution duct(s) 14 are in the PSU.

In a further contemplated embodiment, the air distribution duct(s) 14 may encompass a plurality of air distribution ducts 14 that extend along various portions of the fuselage of the aircraft. Similarly, the air intake duct(s) 16 may encompass a plurality of air intake ducts 16 that extend along portions of the fuselage. In other words, the present invention does not require that any one air intake duct 16 or air distribution duct 14 extend the entire length of the fuselage of the aircraft.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. An air duct, comprising:
    a first chamber and a second chamber, the first chamber being defined between an air handling device and the second chamber, and the second chamber being defined between the first chamber and an environment exterior to the air duct;
    a plurality of first openings between the first chamber and the second chamber;
    a plurality of second openings between the second chamber and the environment exterior to the air duct; and a sound absorbing material defining at least a portion of an interior surface of at least one of the first chamber and the second chamber, the sound absorbing material covering all of the interior surface of the at least one of the first chamber and the second chamber.

2. The air duct of claim 1, wherein the sound absorbing material is disposed on at least a portion of an interior surface of the first chamber.

3. The air duct of claim 1, wherein the sound absorbing material is disposed on at least a portion of an interior surface of the second chamber.

4. The air duct of claim 2, wherein the sound absorbing material is disposed on at least a portion of an interior surface of the second chamber.

5. The air duct of claim 1, further comprising a body defining a periphery of the air duct, the body comprising a first portion defining at least a portion of the first chamber and a second portion defining at least a portion of the second chamber.

6. The air duct of claim 5, further comprising a wall dividing the air duct into the first chamber and the second chamber, the wall defining at least a portion of the interior surface of the first chamber and the second chamber.

7. The air duct of claim 1, further comprising:
a body defining a length between a first end and a second end;
wherein the sound absorbing material extends along a portion of the length.

8. The air duct of claim 1, wherein the plurality of second openings are disposed between the plurality of first openings.

9. The air duct of claim 5, wherein the body is cylindrical.

10. The air duct of claim 5, wherein the body comprises a first portion separable from a second portion.

11. The air duct of claim 10, wherein the first portion connects to the second portion by a snap-fit connector.

12. The air duct of claim 1, wherein a first cross-sectional area of the first chamber is greater than or equal to a second cross-sectional area of the second chamber.

13. An aircraft, comprising:
a fuselage; and
an air duct mounted within the fuselage, comprising:
a first chamber and a second chamber, the first chamber being defined between an air handling device and the second chamber, and the second chamber being defined between the first chamber and an environment exterior to the air duct;
a plurality of first openings between the first chamber and the second chamber;
a plurality of second openings between the second chamber and the environment exterior to the air duct; and
a sound absorbing material defining at least a portion of an interior surface of at least one of the first chamber and the second chamber, the sound absorbing material covering all of the interior surface of the at least one of the first chamber and the second chamber.

14. The aircraft of claim 13, wherein the sound absorbing material is disposed on an interior of the first chamber.

15. The aircraft of claim 14, wherein the sound absorbing material is disposed on a portion of the interior of the second chamber.

16. The aircraft of claim 13, wherein the sound absorbing material is disposed on an interior surface of the second chamber.

17. The aircraft of claim 16, wherein the sound absorbing material is disposed on a portion of the interior surface of the second chamber.

18. The aircraft of claim 13, wherein the air duct further comprises a body defining a periphery of the air duct, the body comprising a first portion defining at least a portion of the first chamber and a second portion defining at least a portion of the second chamber.

19. The aircraft of claim 13, wherein the plurality of second openings are disposed between the plurality of first openings.

20. The aircraft of claim 18, wherein the first portion is separable from the second portion and the first portion connects to the second portion by a snap-fit connector.

* * * * *